UNITED STATES PATENT OFFICE.

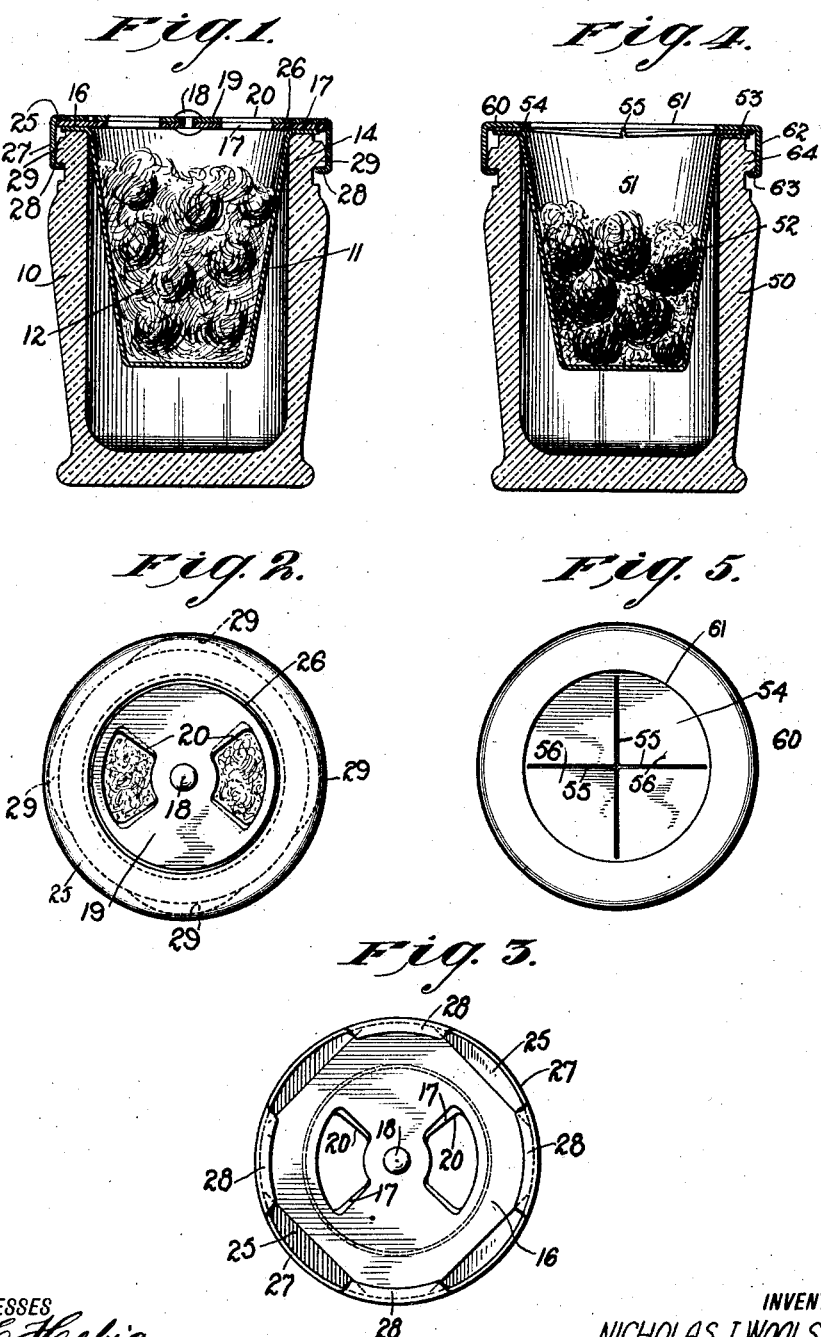

NICHOLAS I. WOOLSEY, OF NEW YORK, N. Y.

DENTAL-COTTON HOLDER AND WASTE-RECEIVER.

1,394,391.　　　　　Specification of Letters Patent.　　Patented Oct. 18, 1921.

Application filed July 8, 1919. Serial No. 309,292.

*To all whom it may concern:*

Be it known that I, NICHOLAS I. WOOLSEY, a citizen of the United States, and a resident of the city of New York, Tottenville, borough of Richmond, in the county of Richmond and State of New York, have invented a new and Improved Dental-Cotton Holder and Waste-Receiver, of which the following is a full, clear, and exact description.

The object of the invention is to provide a new and improved dental cotton holder and waste receiver more especially designed for use by dentists, and arranged to enable the dentist to keep a supply of bunched dental cotton on hand for, say, a day's work, and to permit the dentist to readily dispose of the soiled, unsightly bunches of waste cotton without exposing either the dental cotton or the waste. Another object is to keep the dental cotton in sanitary condition prior to use. Another object is to prevent flies and other insects from being attracted by the waste. Another object is to permit the dentist to readily take hold of a bunch of dental cotton with a pincer or other tool and remove it from its holder and to permit the dentist to dispose of the bunch of waste without being required to touch it with the fingers.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 is a sectional side elevation of the dental cotton holder;

Fig. 2 is a plan view of the same;

Fig. 3 is an inverted plan view of the cover for the cotton holder;

Fig. 4 is a sectional side elevation of the waste receiver; and

Fig. 5 is a plan view of the same.

The dental cotton holder illustrated in Figs. 1, 2 and 3 consists essentially of a jar 10, preferably made of porcelain, glass or similar material, and in this jar is removably held a cup 11 of paper or other suitable cheap material. The cup 11 is adapted to contain bunches 12 of dental cotton sufficient for, say, a day's work. The cup 11 is provided at its upper end with an outwardly extending flange 13 adapted to rest on the top edge of the neck 14 of the jar 10 thus supporting the cup 11 within the jar 10.

The cup 11 is normally closed by a closure comprising a disk 16 resting on top of the flange 13 and having apertures 17 sufficiently large for the passage of a bunch 12 of dental cotton, and the disk 16 is provided with a central pivot 18 on which is mounted to turn a closing disk 19 having apertures 20 normally out of register with the apertures 17 but adapted to register with the same on correspondingly turning the disk 19 on the pivot 18. It will be noticed that the dentist having hold of a pair of tweezers or a similar tool can readily turn the disk 19 until its apertures 20 register with the apertures 17 to permit the dentist to pass the tweezers into the cup 11 and take hold of a bunch 12 of dental cotton and to remove the same from the cup by way of the registering apertures 17 and 20 for use in the usual manner. After the bunch of dental cotton is withdrawn from the cup 11 the disk 19 is turned into closed position to protect the contents of the cup 11 from extraneous matter. In order to permit a convenient turning of the disk 19 by the use of the tweezers the disk 19 is provided on diametrically opposite sides with serrations or teeth 21 any one of which may be engaged by the tweezers.

The disk 16 of the cup closure is held within a cap 25, preferably made of metal, and having an opening 26 in which extends the closing disk 19 of the closure. The cap 25 is provided with a depending annular flange 27 terminating at its lower end in inwardly spaced lugs 28 adapted to engage the under side of locking lugs 29 formed integrally on the outer face of the neck 14 of the jar 10. By the arrangement described the cap 25 is detachably locked on the upper end of the jar 10 and the cap holds the disk 16 of the closure in firm contact with the flange 13 of the cup 11 thus holding the said flange 13 in position on the upper edge of the neck 14 of the jar 10. It will be noticed that by this arrangement the closure disk 16 is held against turning to permit of conveniently turning the disk 19 for the purpose above described. It will further be noticed that the cap 25 on being given a short turn can be readily unlocked and removed from the jar 10, it being understood that the closure disks 16 and 19 remain in the cap when removed from the jar. Convenient access is now had to the cup 11 to remove the same from the jar whenever it is desired to do so or for filling the cup with bunches 12 of dental cotton prior to replacing the same in the jar. It is further understood that the cup 11 can also be filled with the bunches of dental cotton prior to beginning the day's work by passing the bunches through the registering apertures 17 and 20.

The waste receiver shown in Figs. 4 and 5 is practically of the same construction as the dental cotton holder with the exception of the closure. The waste receiver comprises essentially a jar 50 adapted to contain a cup 51 for holding the soiled, unsightly bunches 52 of waste cotton, and the said cup 51 is provided with a flange 53 resting on the top edge of the jar 50. The flange 53 is engaged by a closure disk 54 provided with slits 55, preferably in the form of a cross, to form yielding tongues 56 to permit the dentist to readily push a bunch 52 of waste cotton into the cup 51 and allowing ready withdrawal of the pincers or other tool used for the purpose. The closure disk 54 is held in place on the flange 53 by a cap 60, similar to the cap 25, and having its central opening 61 disclosing the slitted central portion of the closure disk 54. The cap 60 is provided with a depending flange 62 having inwardly extending locking lugs 63 adapted to engage locking lugs 64 similar to the lugs 29 above mentioned so that further description of the same is not deemed necessary. It is understood that the dentist can readily push the soiled, unsightly bunches of waste cotton 52 through the slitted disk 54 into the receiving cup 51 and after the cup 51 is filled the dentist removes the cap 60 and with it the closure disk 54 to permit of removing the filled cup 51 from the jar 50. A new cup 51 is now placed in position in the jar 50 and then the cap 60 and the closure disk 54 are replaced.

From the foregoing it will be seen that the bunches 12 of dental cotton and the bunches 52 of waste dental cotton are kept out of sight and the dentist can readily remove a bunch 12 of dental cotton from the cup 11 and can readily insert a bunch 52 of soiled waste dental cotton into the cup 51.

Having thus described my invention, I claim as new and desire to secure by Letters Patent:—

1. A receptacle of the character described, comprising a jar, a removable cup in the jar, a closure for the cup and having means for permitting bunched material to be inserted in the cup, and a cap having a central opening and removably secured upon the jar and holding said closure in position.

2. A receptacle of the character described, comprising a jar, a paper cup having a flange resting upon the upper edge of the jar supporting it therein, a closure for the cup resting upon the flange of the cup and having means for permitting bunched material to be inserted in the cup, and a cap having a central opening and removably secured upon the jar and clamping the closure on the flange of the cup.

3. A receptacle for holding dental cotton, comprising a jar, a removable cup in the jar, a closure for the cup and having radial slits intersecting each other at the center of the closure, and a cap having a central opening and removably secured on the jar.

4. A receptacle for holding dental cotton or receiving dental cotton waste, comprising a jar, a cap having a central opening, interlocking means on the jar and cap for removably locking the cap in place on the jar, a cup extending into the jar and having a flange seated on the edge of the jar, and a disk held in the said cap and adapted to rest on the said cup flange to hold the latter in place on the jar, the said disks having slits forming self-closing tongues to permit of forcing dental cotton waste into the cup.

NICHOLAS I. WOOLSEY.